United States Patent [19]
Cunningham et al.

[11] 3,914,326

[45] Oct. 21, 1975

[54] CATALYZED DECOMPOSITION OF VIC-DIIODOPERHALOALKANES

[75] Inventors: William J. Cunningham, Williamsville; Richard F. Sweeney, Elma, both of N.Y.; Charles C. Y. Yao, St. Louis, Mo.; Louis G. Anello, Orchard Park, N.Y.

[73] Assignee: Allied Chemical Corporation, New York, N.Y.

[22] Filed: Nov. 26, 1973

[21] Appl. No.: 419,012

Related U.S. Application Data

[63] Continuation of Ser. No. 21,777, March 9, 1970, abandoned.

[52] U.S. Cl. ............................................ 260/653.5
[51] Int. Cl.$^2$ ........................................ C07C 21/18
[58] Field of Search ..................... 260/653.5, 654 D

[56] References Cited
UNITED STATES PATENTS

| | | | |
|---|---|---|---|
| 2,647,934 | 8/1953 | Hillyer et al. | 260/654 |
| 2,880,248 | 3/1959 | Miller | 260/653.5 |
| 3,505,417 | 4/1970 | Gardner | 260/653.5 |

OTHER PUBLICATIONS
Smith, College Chemistry, pp. 171 and 172, (1946), (6th Edition).

*Primary Examiner*—D. Horwitz
*Attorney, Agent, or Firm*—Jay P. Friedenson

[57] ABSTRACT

Vic-diiodoperhaloalkanes are decomposed to iodine and corresponding perhaloalkenes by heating, at substantially atmospheric pressure, in the presence of alkali metal iodides, $NH_4I$ or tetraalkyl ammonium iodides and in the presence of an inert polar organic solvent.

14 Claims, No Drawings

CATALYZED DECOMPOSITION OF VIC-DIIODOPERHALOALKANES

This is a continuation of application Ser. No. 21,177, filed Mar. 9, 1970, now abandoned.

CROSS REFERENCE TO RELATED APPLICATIONS AND PATENTS

1. Commonly assigned U.S. Pat. No. 3,453,333, entitled, "Fluorinated Ethers", issued July 1, 1969.
2. Commonly assigned copending application of Louis G. Anello and Richard F. Sweeney, Ser. No. 582,258, entitled, "Azeotropic Distillation of Fluorinated Ether and Acetonitrile", filed Sept. 27, 1966.

BACKGROUND OF THE INVENTION

This invention relates to a method for decomposing vic-diiodoperhaloalkanes to perhaloalkenes and iodine.

Iodine is an expensive chemical in limited supply. Economic operation of chemical processes utilizing iodine requires minimization of iodine losses as may occur for various reasons. In instances where iodine is bound in by-products or off-grade products unsuitable for use, process economics generally dictate recovery of iodine values from such by-products or offgrade products. We have found a method for the economic recovery of iodine values from vic-diiodoperhaloalkane products which method has the further advantage of yielding the corresponding perhaloalkenes which are also valuable industrial products.

The method of the invention is of particular value in recovering $I_2$ and tetrafluoroethylene from 1,2-diiodotetrafluoroethane which is produced as a by-product in the reaction of $(CF_3)_2CFO^-K^+$ with tetrafluoroethylene in the presence of $I_2$ to produce $(CF_3)_2CFOCF_2CF_2I$ as described in U.S. Pat. No. 3,453,333. The $I_2$ and tetrafluoroethylene decomposition products are two of the raw materials needed for the basic reaction to produce $(CF_3)_2CFOCF_2CF_2I$.

SUMMARY OF THE INVENTION

We have discovered that vic-diiodoperhaloalkanes are decomposed to iodine and corresponding perhaloalkenes by heating in the presence of an iodide salt selected from the group consisting of alkali metal iodides, ammonium iodide ($NH_4I$) and tetraalkylammonium iodides and in the presence of an inert polar organic solvent, at substantially atmospheric pressure, at temperatures in the range of about 50°–300°C. and for a period of time sufficient to decompose a substantial quantity of the vic-diiodoperhaloalkane to the corresponding perhaloalkene and iodine.

Vic-diiodoperhaloalkanes which may be so decomposed may have fluorine, chlorine and bromine substitution in addition to the two iodine substituents in vicinal position, but may not be further substituted with iodine.

The iodine liberated by decomposition of vic-diiodoperhaloalkanes in accordance with the invention method remains dissolved in the decomposition mixture, and probably associates with the iodide salt present therein to form polyiodides. Elemental iodine may be recovered from the decomposition mixture by conventional method such as by drowning the decomposition mixture in water, followed by treatment with oxidizing agents, such as chlorine, bromine, hydrogen peroxide, and others, to precipitate elemental iodine, and separation of the precipitated elemental iodine by filtration. Other methods for recovering elemental iodine from the decomposition mixture will readily occur to those skilled in the art.

To illustrate the invention method, when a sym-diiodotetrafluoroethane is heated in the presence of potassium iodide and in the presence of an inert polar organic solvent such as acetonitrile the sym-diiodotetrafluoroethane decomposes into iodine and tetrafluoroethylene according to the equation

It is believed that the iodine so liberated associates with the potassium iodide to form a potassium polyiodide:

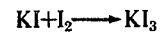

In any event, elemental iodine may be readily liberated from the decomposition mixture such as by drowning the decomposition mixture in water and treating the aqueous mixture thus obtained with an oxidizing agent.

The decomposition of vic-diiodoperhaloalkanes in the presence of iodide salts to yield iodine and corresponding perhaloalkenes is surprising since it is known that potassium polyiodides can be reacted with tetrafluoroethylene to form symdiiodotetrafluoroethane and since sym-diiodotetrafluoroethane cannot be effectively decomposed by heat alone in the absence of a catalyst.

DESCRIPTION OF THE PREFERRED EMBODIMENTS

With respect to the vic-diiodoperhaloalkanes which may suitably be decomposed in accordance with the method of the present invention, vic-diiodoperfluoroalkanes are preferred and, still preferably, vic-diiodoperfluoroethanes. The preferred diiodoperhaloethane is 1,2-diiodotetrafluoroethane. The preferred carbon content for vic-diiodoperhaloalkanes other than the ethanes is from 3–6.

With respect to the iodide salts which may suitably be employed to catalyze decomposition of vic-diiodoperhaloalkanes in accordance with the method of the present invention, alkali metal iodides are preferred and, still preferably, potassium iodide. The term iodide as used in the specification and claims, includes polyiodides such as, for example, $KI_3$.

The presence of an iodide salt as defined herein, even in exceedingly small amounts, for example in the order of .1 wt. % based on the vic-diiodoperhaloalkane present, will serve to catalyze the decomposition of the vic-diiodoperhaloalkane. The rate of decomposition increases to a point with increasing amount of iodide salt. There is no advantage in employing more than about 50 wt. % iodide salt based on the vic-diiodoperhaloalkane but larger amounts will not deleteriously affect the reaction. Preferred iodide salt: vic-diiodoperhaloalkane weight ratios range between about 1:1 and about 1:20. Still preferred are those between about 1:1 and about 1:10. When sym-diiodotetrafluoroethane is decomposed in accordance with the invention method using potassium iodide as catalyst and acetonitrile as solvent, the preferred $KI:C_2F_4I_2$ weight ratio is about 1:10.

The iodide salt may already be present in the reaction mixture containing the vic-diiodoperhaloalkane which is to be decomposed. For example, in the reaction of $(CF_3)_2CFO^-K^+$ with tetrafluoroethylene in the presence of $I_2$ to produce $(CF_3)_2CFOCF_2CF_2I$ as described in U.S. Pat. No. 3,453,333, mentioned supra, KI, as well as sym-diiodotetrafluoroethane, are formed as byproducts in the reaction. Of course, if the iodide salt is already present in the reaction mixture none need be added and the decomposition may be carried out by merely heating the reaction mixture to a suitable temperature level and for a sufficient period of time to effectuate substantial decomposition. Otherwise, the iodide salt is added in the desired amounts before heating is started.

Suitable solvents in accordance with the invention process are polar organic solvents which are inert to the reactants and products of the reaction. Specific examples of suitable polar organic solvents are alkyl nitriles such as acetonitrile, lower alkyl t-amides such as dimethylformamide, butyrolactone, sulfolanes such as 2-methyl sulfolane and sulfones such as methyl ethyl sulfone. Acetonitrile is a preferred solvent. Other suitable solvents will readily occur to those skilled in the art. The amount of solvent employed is not critical, but should be used in sufficient quantity to effectively disperse the reactants.

Decomposition of vic-diiodoperhaloalkanes in accordance with the method of the present invention is preferably carried out under substantially anhydrous conditions, but even relatively large amounts of water, for example up to 20% by weight and over will not deleteriously affect the reaction. The vic-diiodoperhaloalkanes are, as a class, insoluble in water. If too much water is present effective contact between the vic-diiodoperhaloalkane and the iodide salt will be prevented and the rate of decomposition will become unduly low.

Decomposition of vic-diiodoperhaloalkanes in accordance with the Preferably, of the present invention is conducted under substantially atmospheric pressure. By substantially atmospheric, we mean that no significant positive pressure is placed on the system. Of course, if a reflux condenser is employed, there may be created in the system a few pounds of pressure due to the weight of liquid in the column. A small amount of pressure could be tolerated in the system but there is no advantage in operating in this way. Unduly high pressure will prevent the effective evolution of the gaseous products. preferably, the pressure in the system should be kept below about 10 psig although higher pressures can be tolerated without adverse effects with provision for venting gaseous products.

Suitable decomposition temperatures of the reaction mixtures range between about 50°–300°C. The rate of decomposition increases with temperature and with time. Decomposition temperatures between about 85–200°C. are preferred and still preferred temperatures are those between about 110°–180°C. Most preferred is the boiling point of the reaction mixture.

A substantial quantity of the vic-diiodoperhaloalkane is decomposed at 50°C. if the reaction period is at least about four hours. At higher temperatures, an equivalent or greater decomposition could be achieved with shorter reaction periods. At high temperatures, for example, the boiling point of the reaction mixture, substantial decomposition will result within about one hour. The term substantial, as used to describe the extent of decomposition as used herein, is intended to mean decomposition in excess of 25% by weight of the vic-diiodoperhaloalkane present. Preferably, reaction time is at least about four hours and, still preferably, reaction time is at least about ten hours. Ordinarily, complete decomposition is accomplished within about 24 hours.

The perhaloalkenes obtained by the decomposition of vic-diiodoperhaloalkanes in accordance with the method of the present invention have lower boiling points than the corresponding vic-diiodoperhaloalkanes from which they are derived. Hence, the perhaloalkenes may be conveniently recovered from the decomposition mixture by distillation as they are being formed. This may be accomplished by conducting the decomposition in apparatus comprising a reboiler associated with a reflux condenser. Decomposition is conducted at the reflux temperature of the decomposition mixture in the reboiler. The head temperature of the reflux condenser will be below the boiling point of the vic-diiodoperhaloalkane starting material and the chosen solvent so that starting material and solvent are continually refluxed. The perhaloalkene exits from the top of the reflux condenser and may be recovered by conventional methods, such as by condensation in suitable apparatus. In this embodiment, the preferred decomposition temperature, as discussed, applies to the temperature of the decomposition mixture in the reboiler.

EXAMPLE 1

Apparatus employed included a 1 liter round bottom flask connected to a vacuum jacketed 36 in. long glass reflux column filled with glass helices, the top of which was connected to a water-cooled reflux condenser. The exit of the reflux condenser was connected to a wet-test gas meter. Connections were gas tight throughout so that all gas generated within the apparatus had to pass through the gas meter. The flask was charged with 1,090 g (3.18 mols) of sym-diiodotetrafluoroethane and 225 g. of acetonitrile. The flask contents were mixed, the apparatus was sealed, and the flask contents heated to a pot temperature of 87°C. After 1.3 hours reflux time there had passed through the gas meter 0.03 liter of tetrafluoroethylene. On the assumption that 24 liters of tetrafluoroethylene, under test conditions, are equivalent to about one mol of tetrafluoroethylene, the decomposition rate of the sym-diiodotetrafluoroethane was 0.0004 mols per mole per hour.

EXAMPLE 2

To the mixture in the flask in Example 1 after cooling was added 10 g. potassium iodide, and heating at a pot temperature of 87°C. was continued for one hour. During that one hour reflux period there passed through the gas meter 0.5 liter of tetrafluoroethylene, The decomposition rate of the sym-diiodotetrafluoroethane was 0.007 mols per mol per hour. Thus, addition of 10 g. KI (equivalent to about 1 percent by weight of KI on the basis of the sym-diiodotetrafluoroethane charged) caused a seventeen-fold increase in decomposition rate.

EXAMPLE 3

To the mixture in the flask of example 2, after cooling, was added an additional 90 g. of potassium iodide. The contents of the flask were brought to reflux and were maintained at reflux temperature of 87°C. for a period of one hour, during which period there passed through the gas meter 11.55 liters of tetrafluoroethylene. Thus, the rate of decomposition was 0.16 mol per mol per hour.

EXAMPLE 4

The procedure described in Examples 1–3 is repeated except that the reactants, solvents, catalysts and temperatures are sometimes varied as shown in the following table.

TABLE

| Vic-diiodoperhaloalkane | Catalyst | Temperature | Time (at each (Hrs) stage) |
|---|---|---|---|
| 1,2-diiodohexafluoropropane | None | 70°C. | 1 Hour |
| 1,2-diiodohexafluoropropane | $NH_4I$ | 70°C. | 1 Hour |
| 2,3-diiodoperfluorohexane | None | 100°C. | 4 Hours |
| 2,3-diiodoperfluorohexane | tetraethyl ammonium iodide | 100°C. | 4 Hours |
| sym-diiodotetrafluoroethane | None | 130°C. | 6 Hours |
| sym-diiodotetrafluoroethane | $KI_3$ | 130°C. | 6 Hours |

In all cases the presence of an iodide catalyst increases the decomposition rate of the vic-diiodoperhaloalkane by a factor of at least 10.

It can be seen from the data in Example 1–4 that the presence of iodide salts as described herein appreciably catalyzed the decomposition of vic-diiodoperhaloalkanes.

We claim:

1. The method which comprises heating a mixture consisting essentially of vic-diiodoperfluoroalkane, an iodide salt selected from the group consisting of alkali metal iodides, $NH_4I$ and tetraalkyl ammonium iodides and an inert polar organic solvent, at substantially atmospheric pressure, at temperatures in the range of about 50°–300°C., and for a period of time sufficient to decompose a substantial quantity of the vic-diiodoperfluoroalkane to the corresponding perfluoroalkene.

2. The method of claim 1 in which the iodide salt is selected from the group consisting of alkali metal iodides and tetraalkyl ammonium iodides.

3. The method of claim 2 wherein temperatures are maintained between about 85°–200°C.

4. The method of claim 2 wherein temperatures are maintained between about 110°–180°C.

5. The method of claim 2 wherein the vic-diiodoperfluoroalkane is a vic-diiodoperfluoroethane.

6. The method of claim 2 wherein the iodide salt is an alkali metal iodide.

7. The method of claim 2 wherein the vic-diiodoperfluoroalkane is a vis-diiodoperfluoroethane and wherein the iodide salt is an alkali metal iodide.

8. The method of claim 7 wherein the vic-diiodoperfluoroalkane is 1,2-diiodotetrafluoroethane.

9. The method of claim 8 wherein the alkali metal iodide is KI.

10. The method of claim 9 wherein the inert polar organic solvent is acetonitrile.

11. The method of claim 10 wherein temperatures are maintained between about 85°–200°C.

12. The method of claim 11 wherein temperatures are maintained between about 110°–180°C.

13. The method of claim 12 wherein heating is continued for a period of at least 4 hours.

14. The method of claim 13 wherein heating is continued for a period of at least 10 hours.

* * * * *